Sept. 4, 1945.  W. H. NEELY  2,384,191
SPRINGS AND SPRING CONSTRUCTIONS FOR CUSHIONED SEATS
Filed Nov. 18, 1941  4 Sheets-Sheet 1
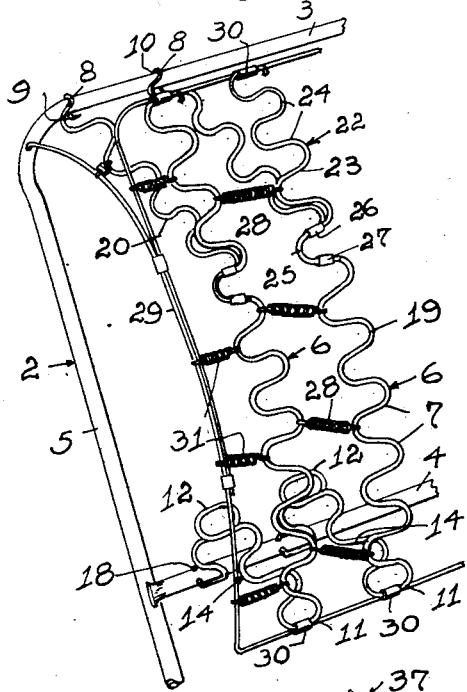
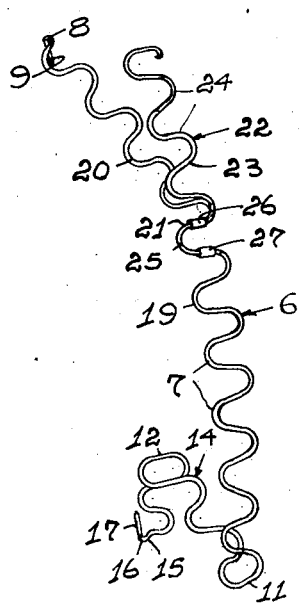
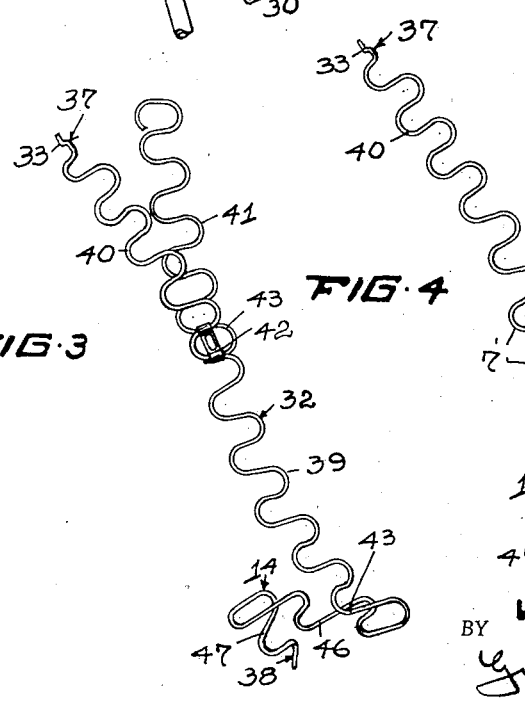
INVENTOR.
WILLIAM H. NEELY
BY
ATTORNEY Sept. 4, 1945.   W. H. NEELY   2,384,191
SPRINGS AND SPRING CONSTRUCTIONS FOR CUSHIONED SEATS
Filed Nov. 18, 1941   4 Sheets-Sheet 2
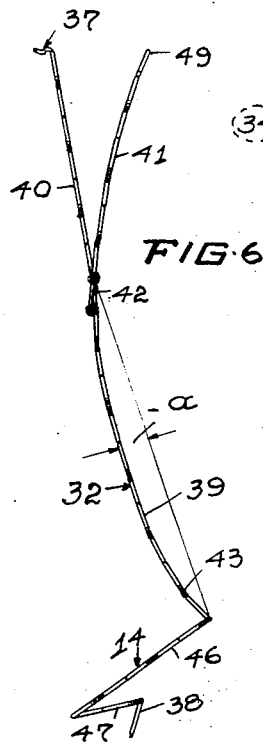
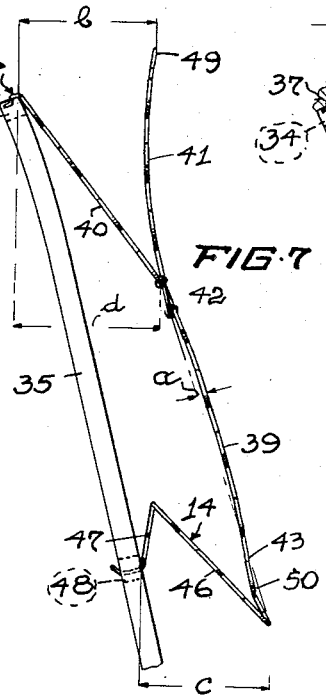
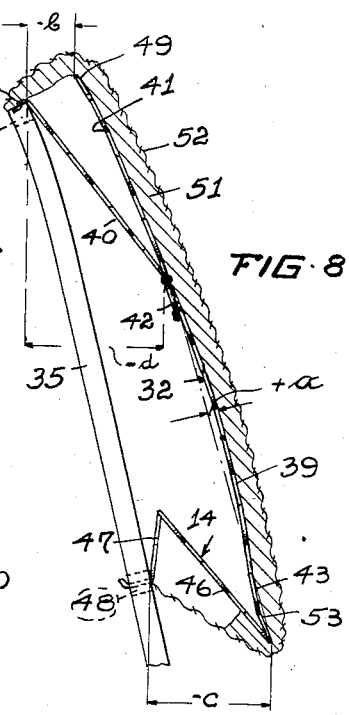
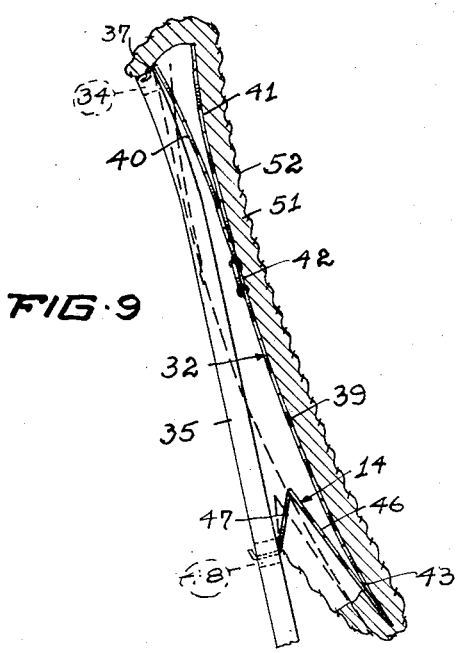
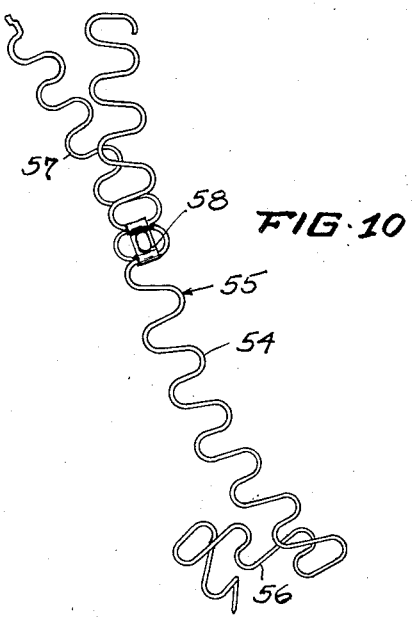
INVENTOR.
WILLIAM H. NEELY
BY Gustav A. Wolff
ATTORNEY

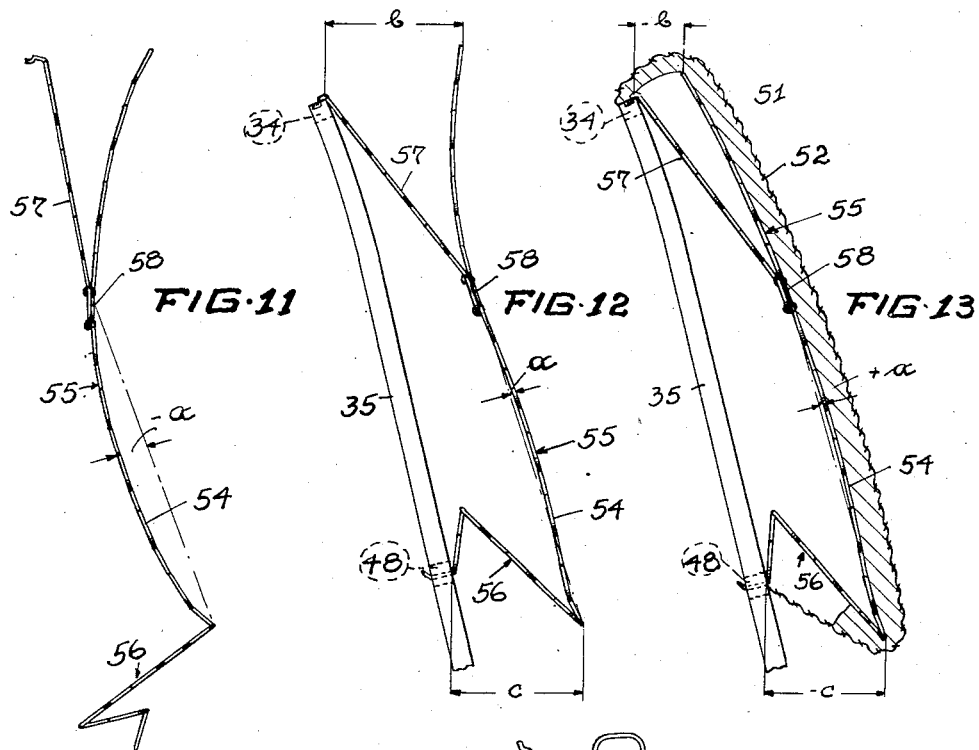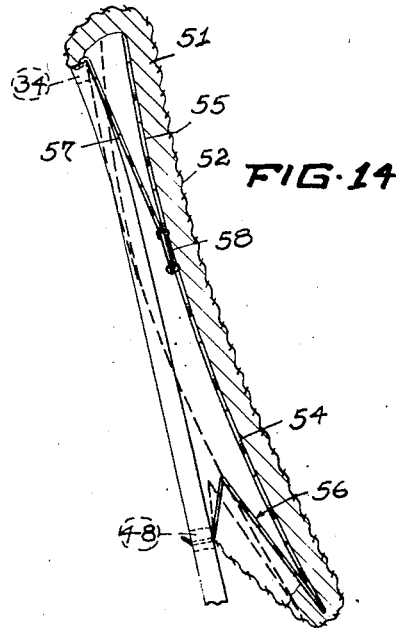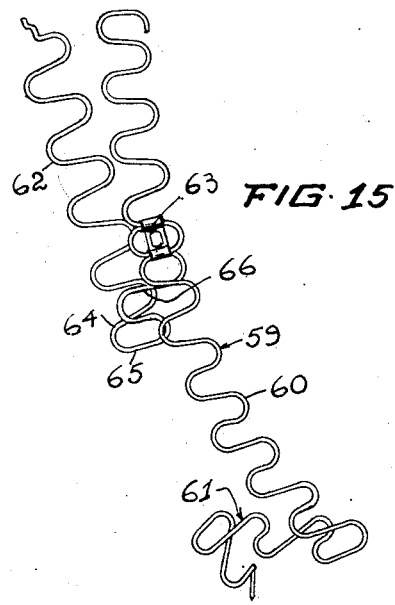

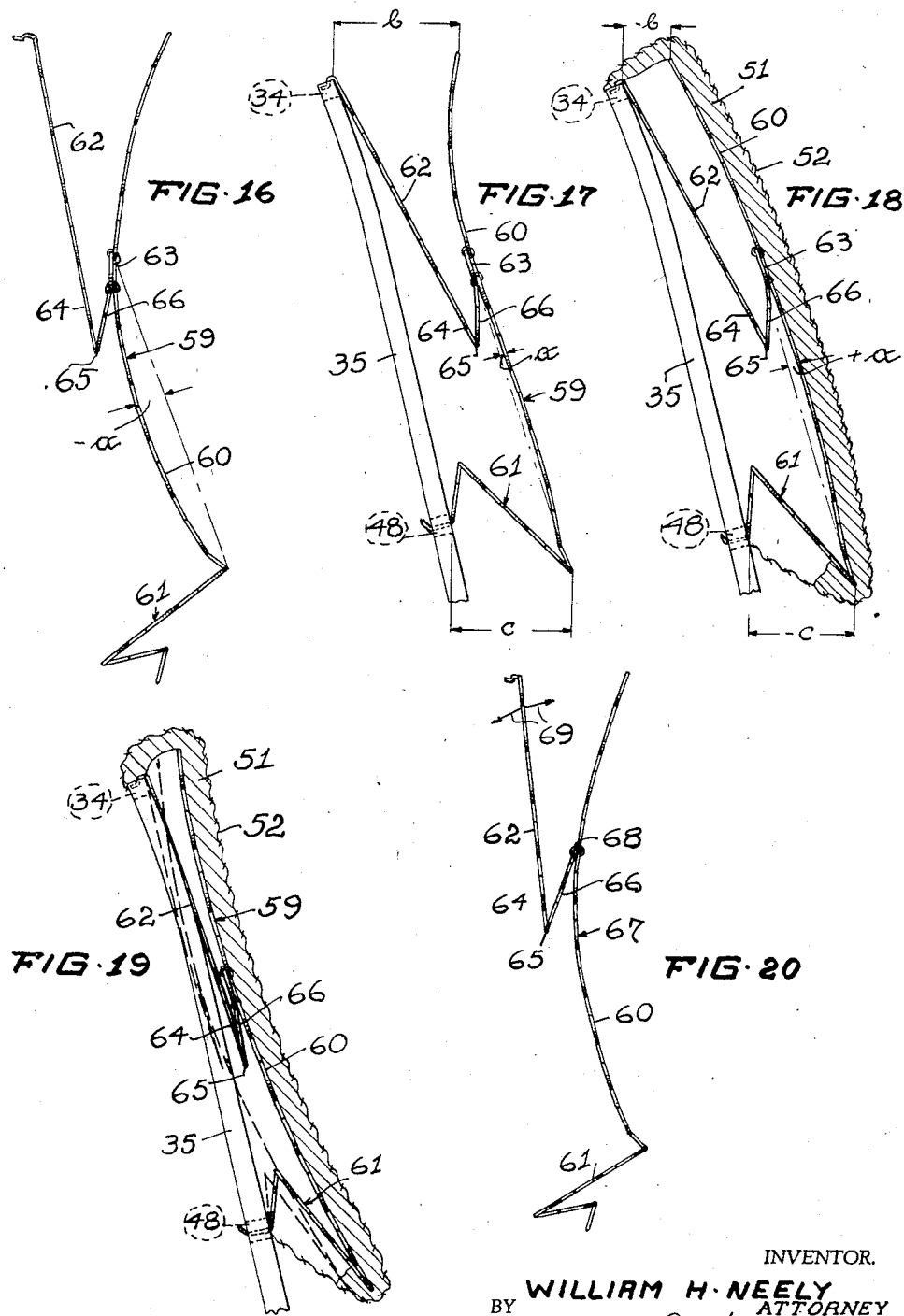

Patented Sept. 4, 1945

2,384,191

UNITED STATES PATENT OFFICE 2,384,191

SPRING AND SPRING CONSTRUCTIONS FOR CUSHIONED SEATS

William H. Neely, Cleveland, Ohio, assignor, by mesne assignments, to The Universal Wire Spring Company, Cleveland, Ohio, a corporation of Ohio Application November 18, 1941, Serial No. 419,579

7 Claims. (Cl. 155—179)

This invention is a continuation in part of my pending applications Ser. No. 307,151 (filed Dec. 1, 1939) now Patent Number 2,308,772, patented Jan. 19, 1943, and Ser. No. 308,543 (filed Dec. 11, 1939) now Patent Number 2,363,351, patented Nov. 21, 1944, and relates in general to cushioned structures for upholstered seat constructions in vehicles, aeroplanes, furniture and the like, and more particularly to spring units for these cushioned structures, which spring units have to counteract vertical and horizontal stresses and have to change the contour of their supporting surfaces to loads applied in use.

It is the general object of the invention to provide a spring unit for cushioned structures of the type described which embodies a plurality of elongated, preshaped and pretensioned springs constructed and mounted to counteract combined vertical and horizontal stresses, with the springs of the unit preshaped and additionally torsionally tensioned for proper yield of the supporting surface of the unit and its change to the contour of the load applied in use.

Such a general object of the invention is attained by rigidly mounting a plurality of sinuously corrugated springs on a frame structure transversely thereof and in parallel relation with respect to each other, the springs being provided with straight portions between their left- and right-handed loops, and prior to their assembly preshaped to definite forms by twisting their straight portions, and when assembled tensioned in these straight portions to give the springs and the spring unit the desired contour.

Another object of the invention is to provide a spring unit for cushioned structures of the type described which embodies a plurality of sinuously corrugated, preshaped and pretensioned springs constructed with straight portions between their left- and right-handed loops and mounted to counteract vertical and horizontal stresses, with the springs of the unit preshaped and additionally torsionally tensioned for proper yield of the supporting surface of the unit and its change to the contour of the load applied in use, the springs prior to their assembly being preshaped to substantially concave contour by twisting their straight portions and in assembled condition being torsionally tensioned to force same into substantially convex contour for proper yield under load and change of their contour to the load applied in use.

A further object of the invention is to provide a cushioned structure embodying a spring unit having a frame and a plurality of sinuously corrugated springs spanning the frame and rigidly secured thereto; with the springs constructed with straight portions between their left- and right-handed loops, which portion, in unassembled condition of the springs, are twisted to preshape these springs to substantially concave contour and, in assembled condition of the springs, torsionally tensioned to change the contour of the springs to convex contour; and with the said straight portions additionally torsionally tensioned by covering material stretched over the assembled spring unit for properly covering the back structure and shaping same and effecting proper yield and change of contour of the back structure when loaded.

To obtain above and similar objects of the invention, the invention has other marked improvements and superiorities which distinguish it from presently known structures. These improvements or superior characteristics embodying certain novel features of construction are clearly set forth in the appended claims and several preferred embodiments of springs and spring units particularly well suited to obtain the objects of the invention are hereinafter shown with reference to the accompanying drawings forming part of the specification.

In these drawings:

Fig. 1 is a fragmentary, perspective view of the back of an automobile seat structure with corrugated wire springs having yielding corrugated cantilever means attached thereto.

Fig. 2 is a perspective view of a corrugated wire spring similar to the springs shown in Fig. 1.

Fig. 3 is a perspective view of another corrugated wire spring.

Fig. 4 is a perspective view of the main portion of the spring shown in Fig. 3.

Fig. 5 is a perspective view of the cantilever portion of the spring shown in Fig. 3.

Fig. 6 is a side view of the spring shown in Fig. 3.

Fig. 7 is a sectional view through a back structure with springs of the type disclosed in Figs. 3 through 6 assembled therein and attached to its frame.

Fig. 8 is a sectional view similar to Fig. 7, in which the springs mounted on the frame of the back structure are additionally tensioned by padding and cover means tensionally stretched over the springs and attached to the frame.

Fig. 9 is a sectional view similar to Fig. 8 with the back structure loaded and designating in dotted line the change of the shape of the back structure under excessive load.

Fig. 10 is a perspective view of another form of a corrugated wire spring.

Fig. 11 is a side-view of the spring shown in Fig. 10.

Fig. 12 is a sectional view through a back structure with springs of the type disclosed in Figs. 10 and 11 assembled therein and attached to its frame.

Fig. 13 is a sectional view similar to Fig. 12 with the springs mounted on the frame of the back structure, additionally tensioned by padding and covering means tensionally stretched over the springs and attached to the frame.

Fig. 14 is a sectional view similar to Fig. 13 with the back structure loaded and designating in dotted line the shape of the back structure under excessive load.

Fig. 15 is a perspective view of still another corrugated wire spring.

Fig. 16 is a side view of the spring shown in Fig. 15.

Fig. 17 is a a sectional view through a back structure with springs of the type disclosed in Figs. 15 and 16 assembled therein and attached to its frame.

Fig. 18 is a sectional view similar to Fig. 17, in which the springs mounted on the frame of the back structure are additionally tensioned by padding and covering means tensionally stretched over the springs and attached to the frame; and Fig. 19 is a sectional view similar to Fig. 18 with the back structure loaded and designating in dotted line the shape of the back structure under excessive load.

Fig. 20 is a side-view of a spring somewhat similar to the spring shown in Fig. 16 having its supporting means pivotally connected to the main body of the spring.

Referring now more particularly to Figs. 1 and 2 of the drawings, Fig. 1 represents a fragmentary view of the spring structure of the back of an automobile seat in which a frame 2 of steel tubing with a top rail 3, a bottom rail 4 and side rails 5 supports a plurality of elongated, corrugated wire springs 6 which bridge the frame and are securely attached to the said rails in a manner hereinafter to be described.

The elongated, corrugated wire springs 6 (Fig. 2 showing a spring in its unassembled condition) are made of steel wire bent to sinuous shape, so that their loops 7 extend substantially parallel to each other and permit of longitudinal and vertical yielding and stretching under load. The upper end of each spring 6 is formed with an inwardly extended short integral extension 8, slightly curved in a plane substantially rectangular to the axis of the spring, and is provided at the end of said extension with a downwardly extended straight portion 9, arranged substantially parallel to the axis of the spring and forming with curved extension 8 a hook-shaped attachment means adapted to be sleeved into openings 10 in the top rail 3 for rigid attachment thereto. The lower end of spring 6 is sharply bent at 11 rearwardly and then at 12 downwardly to form a substantially V-shaped supporting arm 14. This arm has its free end 15 slightly offset and formed with a curved integral extension 16 in a plane substantially rectangular to the axis of the spring, and this extension has at its end a double-back straight portion 17 forming with extension 16 a hook-shaped attachment means adapted to be sleeved into openings 18 in bottom rail 4 for rigid attachment thereto. Springs 6, which thus are securely fastened at their end portions to the top and bottom rails 3 and 4 of frame 2, include in their supporting and resting portion 19 means effecting elimination of excessively stiff areas from supporting the back of a person resting on the seat structure. For such purpose, supporting and resting portion 19 of each spring has its upper end portion 20 inwardly offset by bending portion 19 at loop 21 rearwardly, an arrangement which eliminates outwardly bulged areas in upper portion 20 from contact with a load placed against resting portion 19.

Proper yielding action in the upper portion of each spring is effected by a cantilever arrangement 22 embodying a preferably slightly curved, corrugated wire member or cantilever 23, the corrugations 24 of which are similar to the corrugations of spring 6. The lower end of coil 25 of member 23 is slightly forwardly offset and rigidly clamped to loop 21 of spring 6 by means of clips 26, 27 in such a manner that cantilever 23 extends upwardly in a curve substantially following the curvature of the lower portion of spring 6.

The thus constructed and mounted springs are interconnected by short helical springs 28 and secured to a border wire 29 by means of clips 30 and helical springs 31, all as clearly shown in the drawing.

In the modified form of a corrugated wire spring 32 shown in Figs. 3 through 7 the upwardly extended short integral end portion 33 of the springs is formed for attachment to the top rail 34 of a frame 35 having substantially rectangularly cross section. Spring 32 has its main body or supporting portion, that is the portion between attachment means 37 and 38, subdivided into a lower concave-shaped, readily yielding portion 39 and an upper, rearwardly offset, slightly yielding portion 40, which latter is upwardly extended from the upper end of portion 39. Portion 40 which, under load, tends to bulge, is eliminated as a supporting area for such a load by a cantilever-like, sinuously corrugated wire extension 41 which by means of a clip 42 is attached to main body portion 36 near the upper end of concave-shaped portion 39. This cantilever extension, the lower end loop 43 of which is slightly forwardly offset to facilitate attachment to spring 32, is concave-shaped in a manner similar to the shape of portion 39 to form therewith a continuous resting and supporting member having a curvature substantially corresponding to the outline of the spring when assembled in a spring structure and fully loaded. The lower part 43 of portion 39 of spring 32 is preferably more curved to effect a slight setback of the lower area of portion 39 preventing bulging of this area and facilitating its yielding under the load applied when in use.

Elongated, sinuously shaped springs 32, as shown, have left- and right-handed loops 7' extended in straight planes, which loops are connected with each other by straight portions 32' twisted to give the springs the desired contour without deformation of loops 7', an arrangement which materially simplifies shaping of the contour of the springs prior to their assembly for proper control of the springs under load.

In assembling the springs in a back spring construction, the top attachment means 37 of a spring 32 is first connected to top rail 34 of frame 35 and then V-shaped supporting arm 14 is yieldingly shifted by the application of torsional and tensile stresses to move inner lever arm 46 toward the lower portion of the spring and outer arm 47 away from inner lever arm 46 to permit of connecting the lower attachment means to bottom rail 48. In this position of the springs the design shape of the back structure has been partially established by application of tensile and torsional stresses as the concave shape of the spring (marked in Fig. 6 as $-a$) is changed to a slight convex shape (marked in Fig. 7 as $a$). Under these conditions frame 35 is spaced from the end 49 of extension 41 a distance $b$, from the lower end of portion 43 a distance $c$ and from the upper end of portion 39 a distance $d$, and, in addition, lower part 43 of portion 39 is slightly S-curved at 50. To fully establish the shape of the back structure, springs 32 are padded by padding 51 and covered by a covering 52 which is stretched over the springs and its padding and then attached to frame 35 in any suitable manner. This latter procedure forces extension 41 backward so that distance $b$ is decreased to $-b$, distance $c$ to $-c$, distance $d$ to $-d$, and the convex shape of lower portion 39 is increased to $+a$ while S-curved portion at 50 is flattened out as indicated at 53.

Back structures of the type described can readily be formed to any desired design-shape as ratio and force of the applied tensile and torsional stresses control the shape of the structure. Such back structures also readily yield to a load and adapt themselves to the shape of the load, as will best be understood from inspection of Fig. 9 of the drawings which shows in full line the contour of a back structure when loaded, and in dotted line its contour when excessively loaded as by shocks, etc. The resting portion of such a structure has under all conditions a smooth form-fitting contour as the convex shape built-up of the structure under load when the built up resistance in the springs has been overcome changes to concave shape similar to the contour of the springs before their assembly in the back structure.

In the modified form of a spring shown in Figs. 10 through 14 of the drawings, the continuous main body 54 of spring 55 has extended from its lower end a V-shaped supporting arm 56 similar in construction to arm 14 of spring 32. Main body 54 is additionally supported by extension 57, extended rearwardly thereof and secured to body 54 between its opposite ends by means of a clip 58. This construction of springs permits of the use of different wire gages for its upper and lower supports and thus includes additional means for still better control of the shape and action of a back structure.

The resting surfaces of the springs shown in Figs. 1 through 14 each include an area in which the wire of the springs is bent in a direction opposite to the direction of the stresses exerted on the springs when loaded and, consequently, the action in this area differs from the action taking place in other areas of the springs. This is not the case in the modified form of spring construction shown in Figs. 15 through 19, in which springs 59 each embody a continuous main portion 60 with a V-shaped supporting arm 61 similar in construction to arm 14 of spring 32 (see Figs. 3-9) and an additional support by extension 62 rearwardly extended from main portion 60 between its opposite ends. This extension 62, which is secured to main portion 60 by a clip 63, has its end portion 64 sharply upwardly bent at 65 to provide a short attachment lever 66 which is attached to main portion 60, but otherwise springs 59 are constructed similar to the springs disclosed in Figs. 10 through 14. Stresses applied to springs 59 are all in the direction of the bends of these springs, so that main portions 60 of these springs react smoothly under load as lever 66 of extensions 62 provide yielding support for main portions 60 and insure proper shaping of the main portions to the load applied when in use.

The spring construction shown in Figs. 15 through 19 shows support of extension 62 rigidly attached to the main portion of the spring. However, such an attachment, while fully satisfactory and necessary in many cases, effects a deformation of the spring when assembled in a seat structure and necessitates additional bending of the spring and its support 62 to prevent this deformation. Such an action of a spring construction can be avoided by pivotally connecting its support 62 with the main portion 60 as disclosed in the modified spring construction 67 in Fig. 20, which construction is similar to the structure disclosed in Figs. 15 through 19 with the exception that short attachment lever 66 at 68 is pivotally coupled with main portion 60 to permit of support 62 being pivoted with respect to portion 60 in either direction (see arrow 69) without deforming the curvature of the main portion 60 of the spring construction.

Having thus described my invention, what I claim is:

1. A seat structure comprising in combination a frame, and a plurality of elongated, longitudinally extensible springs spanning said frame and rigidly attached thereto, each of said springs embodying a resting portion with yielding supporting means at its one end and a V-shaped portion extended from its other end, one arm of said V-shaped portion forming an extension for said resting portion and the other arm a second supporting means for said resting portion, each resting portion and its extension in unassembled condition of said springs forming a concave curvature having substantially the shape of the load applied in use and in assembled condition of said springs being shifted to a convex curvature having approximately the design-shape of the finished seat structure.

2. A seat structure comprising in combination a frame, and a plurality of elongated, longitudinally extensible springs spanning said frame and rigidly attached thereto, each of said springs embodying a resting portion with supporting means at its one end and a V-shaped portion extended from its other end, one arm of said V-shaped portion forming an extension for said resting portion and the other arm a second supporting means for said resting portion, each resting portion and its extension in unassembled condition of said springs forming a concave curvature having substantially the shape of the load applied in use and in assembled condition of said springs being shifted to a convex curvature having approximately the design-shape of the finished seat structure.

3. A seat structure comprising in combination a frame having spaced oppositely arranged rails, a plurality of sinuously corrugated spring elements spanning said frame and attached to the oppositely arranged rails thereof, each of said spring elements embodying a main body portion, a V-shaped portion at one end of said body portion, said V-shaped portion providing with its one arm an extension for said main body portion axially aligned therewith and with its other arm a supporting portion extended at an inclination from said one end of said body portion, and supporting means on the other end of said body portion, said supporting portion and said supporting means being secured to the respective rails of said frame.

4. A seat structure comprising a frame having oppositely arranged rails and a plurality of elongated spring elements spanning said frame and attached to the rails thereof, each of said spring elements embodying a resilient main body portion, a V-shaped extension at one end of said main body portion, said V-shaped extension having its vertex positioned at said end of said main body portion so that one arm of said V-shaped extension provides an extension for said main body portion in axial alignment therewith, and resilient V-shaped supporting means secured to the other end of said body portion, said V-shaped supporting means being tensioned by predetermined counteracting torsional forces effected by torsional shifting of the arms of said V-shaped means away from each other said V-shaped extension and said V-shaped supporting means being secured to the oppositely arranged rails.

5. A seat structure comprising in combination a frame, and a plurality of elongated longitudinally extensible springs spanning said frame and rigidly attached to opposite rails thereof, each of said springs including a main body portion having at its opposite ends attachment and supporting means, one of said attachment and supporting means being V-shaped and having one arm cooperating with said main body portion in providing said spring with an elongated resting member, each of said springs in unassembled condition having a concavely shaped main body portion following substantially the shape of the load applied and said springs in assembled condition being torsionally pre-tensioned into convex outline.

6. A seat structure comprising a frame, and a plurality of elongated, longitudinally extensible springs spanning said frame and rigidly attached thereto, each of said springs embodying a main body portion, a V-shaped attachment and supporting member integrally extended from one end of said main body portion, and V-shaped means extended from the other end of said body portion so that one arm of said means together with said body portion provides an elongated resting member and the other arm of said means provides a supporting member for said body portion, each of said springs in unassembled condition having a concavely shaped main body portion with a sharply curved area near said one end of said body portion, said springs in assembled condition being torsionally pretensioned into convex shape including a S-curve near the said one ends of their main body portions.

7. A seat structure comprising in combination a frame having oppositely arranged rails, a plurality of elongated, corrugated springs mounted on opposite rails of said frame, and a covering stretched over said springs and fastened to said frame, each of said springs in unassembled condition having a concavely shaped main body portion and V-shaped means extending from one end of said body portion so that the vertex of said V-shaped means is positioned at said end and one arm of said V-shaped means and said body portion provide an elongated resting member, said spring when assembled being torsionally pretensioned into convex shape.

WILLIAM H. NEELY.